United States Patent
Johansson et al.

(10) Patent No.: US 11,404,800 B2
(45) Date of Patent: Aug. 2, 2022

(54) CONDUCTOR JOINT

(71) Applicant: NEXANS, Courbevoie (FR)

(72) Inventors: Mats Johansson, Stromstad (SE); Alf Erik Rod, Halden (NO); Audun Johanson, Oslo (NO); Robin Sangar, Drobak (NO); Brynjar Jacobsen, Halden (NO)

(73) Assignee: NEXANS, Courbevoie (FR)

( * ) Notice: Subject to any disclaimer, the term of this patent is extended or adjusted under 35 U.S.C. 154(b) by 0 days.

(21) Appl. No.: 17/331,618

(22) Filed: May 26, 2021

(65) Prior Publication Data
US 2022/0013925 A1    Jan. 13, 2022

(30) Foreign Application Priority Data

May 29, 2020    (EP) .................................... 20305569

(51) Int. Cl.
| H01R 4/20 | (2006.01) |
| H01R 4/18 | (2006.01) |
| H01B 7/17 | (2006.01) |
| H01B 9/00 | (2006.01) |
| H01R 11/28 | (2006.01) |

(52) U.S. Cl.
CPC .............. *H01R 4/188* (2013.01); *H01B 7/17* (2013.01); *H01B 9/00* (2013.01); *H01R 4/20* (2013.01); *H01R 11/28* (2013.01)

(58) Field of Classification Search
CPC .......... H01R 4/20; H01R 4/021; H01R 4/023; H01R 4/60; H02G 1/14; H02G 15/18
See application file for complete search history.

(56) References Cited

U.S. PATENT DOCUMENTS

| 3,011,010 A | 11/1961 | Lively |
| 3,673,313 A | 6/1972 | Pickett et al. |
| 4,035,007 A * | 7/1977 | Harrison ............... F16L 13/004 420/580 |
| 4,091,233 A * | 5/1978 | Berman ............... H01R 4/5033 174/92 |

(Continued)

FOREIGN PATENT DOCUMENTS

GB    2233166    *    1/1991

OTHER PUBLICATIONS

European Search Report dated Oct. 1, 2020.

*Primary Examiner* — Chau N Nguyen
(74) *Attorney, Agent, or Firm* — Sofer & Haroun, LLP

(57) ABSTRACT

A conductor joint (1) is provided for connecting two conductors along a longitudinal direction. The conductor joint comprises a first segment having a first segment end (202) adapted connecting to an end portion of a first conductor and a second segment (300) comprising a second segment end (302) relative to the longitudinal direction adapted for receiving a second conductor end of a second conductor. The second segment further has an opposite second segment end (304) fixed, or forming an integral part with, an opposite first segment end (204) of the first segment (200), a tubular sleeve (310) and a core rod (320) wherein ends (310a, 320a) of the tubular sleeve (310) and the core rod (320) are arranged with a radial offset forming a sleeve opening for receiving at the end portion of the second conductor end of the second conductor.

26 Claims, 9 Drawing Sheets

(56) References Cited

U.S. PATENT DOCUMENTS

| | | | | |
|---|---|---|---|---|
| 4,990,098 A | * | 2/1991 | Neidecker | H01R 25/162 |
| | | | | 174/117 F |
| 5,660,565 A | * | 8/1997 | Williams | H01R 9/0518 |
| | | | | 439/585 |
| 7,319,194 B2 | * | 1/2008 | Bryla | H02G 1/14 |
| | | | | 174/92 |
| 2005/0037677 A1 | | 2/2005 | Kuwayama | |
| 2022/0006206 A1 | * | 1/2022 | Chae | H01R 4/20 |

* cited by examiner

CONDUCTOR JOINT

RELATED APPLICATION

This application claims the benefit of priority from European Patent Application No. 20 305 569.4, filed on May 29, 2020, the entirety of which is incorporated by reference.

TECHNICAL FIELD

The present invention relates to a conductor joint for connecting two conductors of two high voltage cables and a method thereof.

BACKGROUND AND PRIOR ART

High voltage direct current (HVDC) cables and alternating current (HVAC), such as HVDC mass impregnated cables (HVDC-MI cables) and XLPE insulated cables are known and often used for long distance electrical transmission.

The conductor inside the cable is often made of copper or aluminium having a circular cross-section center wire surrounded by concentric layers of stranded, keystone-shaped wires, resulting in a very compact conductor with a smooth surface. The keystone-shaped strands/wires are wound in a spiral, with the layers being wound in alternating directions. The first layer is e.g. wound in a clockwise spiral, the next layer is wound in a counter clockwise spiral and so on. The configuration of a central wire surrounded by such stranded wires provides the cable with improved flexibility.

The conductor can also be made of copper or aluminum compacted round wires. A number of strands of round wires are wound around each other possibly including layers of opposite directions. After the round wires have been wound together external pressure is applied to compact the wires providing a dens conductor. The centre of the cable consists of one or more stranded round wires.

The conductor of for example a HV cable can be surrounded by a plurality of insulating/protective layers. The insulation system usually consists of lapped paper tapes impregnated with a high viscosity compound (hence the term "mass impregnated"). The cable insulation can also be of extruded and cross-linked PE with semi-conductive layers around the conductor forming a conductor screen and the insulation providing an insulation screen. A moisture proof barrier, a lead alloy sheath, is usually applied above the insulation system. For mechanical and corrosion protection, a polyethylene sheath may be applied. Cable can be of single core type or three-core type. Further, for mechanical strength, transversal reinforcement and steel or copper wire armoring may be applied. To achieve a torsion-balanced design, two layers of armor wires applied in opposite directions are often used, and the armor is corrosion protected by a protective layer. A specific example is a bitumen compound and two layers of polypropylene yarn.

HV cables are often used to traverse extremely long distances, for example 50 km. However, when the cables are not able to be manufactured and/or transported in one continuous length, therefore the cables must be joined together at a transition joint/joint section.

The cables may also be jointed in the factory, in order to achieve acquired length for delivery. Jointing in the factory will also take place when the final cable contains cable sections of different design or different cross section.

Several conductor joints are known in the art for connecting the conductors of two high-voltage (HV) cables.

US 2004/0194995 A1 discloses a method for joining the interfacing ends of two cables having a plurality of conductor strands. The method involves i) providing each of the cable ends with an enlarged terminal portion/enlarging member/metal inner sleeve of a greater diameter than the cable adjacent the end, ii) inserting the ends into a connecting tube/sleeve having an outer layer of explosive charge, and iii) detonating the explosive layer so as to compress the connecting tube/sleeve around the conductor strands. The terminal portions abut each other within the connecting tube to provide a joint after denotation.

The enlarging member/metal inner sleeve is provided longitudinally within the cable through the terminal portion to affect the enlargement to splay the outer strands of the cable. The resulting increased terminal extremity diameter of the cable relative to the cable adjacent the terminal portions results in the cable having a lager diameter than the rest of the conductor inside the sleeve of the connector/connecting tube. Thus, the conductors are so anchored within the sleeve/connecting tube that it cannot disadvantageously slip or be displaced.

However, this known method provides a cable joint having areas of larger diameter than the remaining cable thereby providing a cable joint having an impaired bending property which is not capable to withstand the same tensile forces as the cables themselves without the joint.

U.S. Pat. No. 3,320,659 discloses a method for connecting two cable ends by arranging the cable ends in an abutting or overlapping alignment inside a metal conductor sleeve followed by compressing the sleeve onto the cables by circumferential compression.

The cable ends are thereby spliced together with little or no elongation of the cables. The sleeve has a regular smooth barrel shape avoiding corners and sharp edges and may have a roughened inner surface for better gripping the cable ends during compression. The resulting splice has a larger cross-sectional diameter than the conductor's cross-sectional diameter.

GB 688 708 discloses a coupling for stranded electrical conductors, with a rigid insertion piece and a ductile sleeve. After compression of the ductile sleeve the conductors at the joint have variating radial cross sections.

SE 1400140 relates to a power cable comprising a conductive core comprising a first section made of a first metal material and a second section made of a second metal material, and wherein the conductive core has a joint member having a first end made of the first material and a second end made of the second material. The first end and the second end of the joint member have been joined thermally. The conductors are joined to the joint member by welding.

EP 3 139 443 discloses an electrical HV-cable comprising a first and a second electrical HV-cable having conductors of different materials. The electrical HV-cable comprises an electrical cable transition element/joint having a first cable transition element made of the first conductor material and a second cable transition element made of the second conductor material. The first cable transition element is fixedly connected to the second cable transition element in a weld joint formed by friction welding or cold pressure welding. The first and second cable transition element are fixedly connected to the first and second electrical HV-cable in weld joints.

EP 3 224 837 discloses a power cable comprising a conductive core comprising a conductor including a plurality of sections. One of the plurality of sections of the conductor is a first conductor section a first ampacity and another of the plurality of sections of the conductor is a second conductor section having a second ampacity which is different from the first ampacity. The plurality of sections are thermally joined.

It is thus an object of the present invention to provide a conductor joint that does not reduce the bending properties of the cables/conductors to be connected.

It is a further object of the invention to provide a conductor joint that can withstand the same tensile forces as the cables/conductors to be connected.

It is a further object of the invention to provide a conductor joint having similar or same cross-sectional diameter as the cross-sectional diameter of the two conductors to be connected.

It is a further object of the invention to provide a conductor joint having a short longitudinal length.

It is a further object of the invention to provide a method for installing a conductor in a time efficient and simple manner.

SUMMARY OF THE INVENTION

The present invention is set forth and characterized in the independent claims, while the dependent claims describe other characteristics of the invention.

The invention provides a conductor joint for connecting two high voltage cable conductors of the same or different materials, and a method thereof.

The present invention has as its object to overcome one or more of the disadvantages of the prior art, or at least to provide an alternate conductor joint and method for joining conductors of similar or dissimilar metal, whether of the same or different diameter.

The invention provides a conductor joint for connecting conductors of two HV cables. Examples of HV cables include HVDC-MI cables as disclosed in EP 3416253 A1, incorporated herein by reference and HVAC XLPE cables. The conductors of the HV cables to be joined comprise a circular center wire or group/bundle of center wires surrounded by concentric layers of stranded wires, wherein the wires may be keystone-shaped or compacted.

Before joining the two HV cable conductors, any protective layers and insulating layers are removed from an end portion/terminal portion of each cable, thereby exposing the conductors. Further, an end portion may be machined for providing a specific shape to the end portion of the conductor.

The conductors that are to be interconnected may both comprise a circular center wire or group of center wires surrounded by a plurality of concentrically layers of stranded wires. With an arrangement comprising a circular center wire, said wire would be the innermost wire of the conductor. With an arrangement comprising a group of center wires, the group would be arranged in the center of the conductor.

The conductor joint of the present invention connects two conductors, i.e. a first and second conductor, along a longitudinal direction X.

The conductor joint according to the invention comprises a first segment and a second segment. The first segment has a first segment end, relative to the longitudinal direction X, adapted for connecting to end portion of the first conductor and a second segment has a second segment end, relative to the longitudinal direction X, adapted for receiving a second conductor end of the second conductor.

The second segment further comprises an opposite second segment end relative to the longitudinal direction X which is fixed or forming an integral part with an opposite first segment end of the first segment, relative to the longitudinal direction X.

The second segment also comprises
a tubular sleeve having a minimum inner diameter $Ds_{min}$ and a sleeve length Ls extending in the longitudinal direction X between the second segment end and a merge structure and
a core rod arranged coaxially within the tubular sleeve, the core rod having a core rod length Lr extending in the longitudinal direction X between the second segment end and the merge structure and wherein the core rod further has a maximum outer diameter $Dr_{max}$ being less than the minimum inner diameter $Ds_{min}$.

Ends of the tubular sleeve and the core rod arranged distal to the second segment end are merged at the merge structure and the opposite ends of the tubular sleeve and the core rod are arranged with a radial offset.

The term "merged at a merge structure" signify hereinafter a part/location of the conductor joint where the core rod and the sleeve meet, preferably as an integral part.

A sleeve opening is hence formed between the opposite ends of the tubular sleeve and the core rod for allowing insertion of at least a part/portion of the second conductor end. After insertion, the second segment may be joined to the second conductor by applying pressure such as circular hydraulic pressure to the second segment.

In other words, the core rod comprises a first core rod end and an opposite second core rod end, wherein the first core rod end is merged at the merge structure being distal to the second segment end and the opposite second core rod end is as arranged at or forming a part of the second segment end.

Further, the tubular sleeve comprises a first sleeve end and an opposite second sleeve end, wherein the first sleeve end is merged at the merge structure being distal to the second segment end and the opposite second sleeve end is as arranged at or forming a part of the second segment end.

The sleeve opening is hence formed between the opposite second sleeve end of the tubular sleeve and the opposite second core rod end of the core rod for allowing insertion of at least a portion of the second conductor end. After insertion, the second segment may be joined to the second conductor by applying pressure such as circular hydraulic pressure to the second segment.

That the second segment of the joint comprises a combination of the tubular sleeve with the core rod arranged therein forms a double acting second segment which is configured such that, during connection of at least a portion of the second conductor end, compression of the tubular sleeve causes the layers of stranded wires of the second conductor to be squeezed between the outer sleeve and the inner core rod. Thus, when the external compression is performed directly on the sleeve by for example a hydraulic press, an internal compression of the second segment is performed indirectly by the core rod.

The resulting joint between the second segment and the second conductor will have the same, or almost the same, outer diameter. Hence the tubular sleeve, the core rod and the layers of stranded wires are lengthened in the longitudinal direction X during compression.

According to the invention, the merge structure extends in the longitudinal direction X between the opposite second segment end and the first core rod end of the core rod and the first sleeve end of the tubular sleeve.

In an example aspect, the first sleeve end and the first core rod end merged at the merge structure may be arranged with a radial offset. The radial offset may be equal to or near equal a radial thickness of an outermost surface of at least one stranded wire.

In an example aspect of the invention the core rod length Lr may be equal the sleeve length Ls.

To spread the influence of the second segment on the second conductor after joined together, the core rod length Lr may in another example aspect be longer than the tubular sleeve length Ls such that the core rod extends outside the sleeves inner surface during connection. Before connecting the second conductor end, a longitudinal portion of the circular center wire or group of center wires may be removed from the conductor end, thereby creating a second conductor recess surrounded by the layers of stranded wires. As a result, the circular center wire or group of center wires of the second conductor is not inserted inside the tubular sleeve and therefore not radially compressed by the tubular sleeve during compression. The resulting joint comprises an improved mechanical strength and tensile force.

In a preferred example aspect, the core rod may be arranged concentrically within the tubular sleeve, i.e. within a center axis of the tubular sleeve.

Further, an outer surface of the tubular sleeve may have an inclination angle towards the second segment end and towards the central longitudinal axis C of the second segment. The inclination angle may be from 5 to 80° relative to the central longitudinal axis, more preferably from 20 to 50°, e.g. 30°.

In an example aspect the radial offset between the opposite second sleeve end and the opposite second core rod end may be equal to half the difference between a minimum outer diameter $Dr_{min}$ of the core rod and a maximum inner diameter $Ds_{max}$ of the tubular sleeve.

In another example aspect the tubular sleeve comprises a stepped inner surface wherein said inner surface faces the core rod. The stepped inner surface may be shaped as a tubular stair comprising,
- a lower step surface arranged at, adjacent or adjacent the second segment end,
- a higher step surface arranged distal to the second segment end and
- a step wall arranged between the lower step surface and the higher step surface.

The inner diameter of the tubular sleeve may hence be decreasing in the direction from the second segment end towards the merge structure, as the inner diameter of the inner surface of the tubular sleeve may be smaller at the higher step surface than at the lower step surface.

The step wall may be oriented with a non-zero angle to the lower step surface and the higher step surface, such as for example at an angle of at least 45° or more preferably at least 75°, for example perpendicular.

In this example aspect, the lower and higher step surfaces of the inner surface of the tubular sleeve provide for a step-shaped inner surface of the sleeve. After compression of the tubular sleeve, the inner step-shaped surface of the tubular sleeve, the longitudinal outer surface of the layers of stranded wires and the outer longitudinal surface of the core rod are altered into a wave-shaped form or partial wave-shaped form in the longitudinal direction, thereby forming a locked configuration/locking mechanism/ward between the layers of stranded wires of the second conductor end of second conductor and the second segment of the conductor joint.

In a further example aspect, the tubular stair may comprise an intermediate step surface and an intermediate step wall arranged between the step wall and the higher step surface, where the intermediate step wall is being oriented with a non-zero angle to the intermediate step surface and the higher step. The non-zero angle may preferably be at least 45° or more preferably at least 75°, for example perpendicular.

The lower, intermediate and higher step surfaces may extend in the longitudinal direction X and the length of each step surface in the longitudinal direction X may be equal or near equal. Each step surface may further have a length along the longitudinal direction X of the sleeve which is at least twice a radial height of the step wall.

The radial distance of the step wall of the sleeve may be equal or near equal to a radial thickness of an outermost layer of stranded wires of the second conductor to be connected.

In a further example aspect, the core rod may comprise a stepped outer surface wherein said outer surface faces the inner surface of the tubular sleeve. The stepped outer surface of the core rod may be shaped as a tubular stair comprising
- a lower step core rod surface adjacent the second segment end,
- a higher step core rod surface arranged distal to the second segment end and
- a core rod step wall arranged between the lower step core rod surface and the higher step core rod surface, the core rod step wall being oriented with a non-zero angle to the lower step core rod surface and the higher step core rod surface. The non-zero angle may preferably be at least 45° or more preferably at least 75°, for example perpendicular.

The outer diameter/radial thickness of the core rod may be larger at the higher step core rod surface than at the lower step core surface in this example aspect.

The lower and higher step core rod surfaces may extend in the longitudinal direction X The length of each step core rod surface, in the longitudinal direction X, may be equal or near equal.

The radial distance of the step wall of the core rod may be equal or near equal to a radial thickness of a second layer of stranded wires of the second conductor. The second layer of stranded wires may for example be arrange immediately adjacent and surrounding the circular center wire or group of center wires of the second conductor.

Depending on the number of outer layers of stranded wires on the second conductor, more steps can be arranged at the inner surface of the tubular sleeve and/or at the outer surface of the core rod.

To make a conductor joint wherein the second segment has the same tensile strength and bending diameter as the second conductor to be connected, the sleeve length Ls should be the same or longer than an outer diameter of the second conductor to be connected. For example, the sleeve length may be at least 50% longer than the outer diameter of the second conductor end, preferably at least 100% longer, for example 105% longer. Further, it is preferred that the tubular sleeve length Ls is less than 400% of the outer diameter of the second conductor.

The core rod length Lr may be at least 5% longer than the tubular sleeve length Ls such that the circular center wire or group of center wires of the second conductor is not inserted inside the tubular sleeve. The core rod length Lr may for example be 15% longer than the tubular sleeve length Ls. However, the core rod length Lr is preferably less than 100% longer than the tubular sleeve length Ls.

Further, the minimum outer diameter $Dr_{min}$ of the core rod may be equal to or larger than the outer diameter of a center wire or a maximum outer diameter of the group of center wires of the second conductor end to be connected.

The core rod may further comprise a longitudinal recess for inserting a portion of the second conductor end of the second conductor. The recess may extend in the longitudinal direction X from the opposite second core rod end towards the merge structure. The recess may have a length in the longitudinal direction X being equal to or shorter than half the total length Lr of the core rod, preferably shorter than ¼ of the length Lr of the core rod. Further, the recess may have a radial distance being equal to or less than half of the minimum outer diameter $Dr_{min}$ of the core rod. Such a configuration of the core rod may for example be beneficial if the second conductor comprises a group of center wires wherein one of the wires, such as the center wire of the group of center wires is inserted into the recess before compression. Hence, the radial distance of the recess may have a size allowing insertion of the center wire from the group of center wires of the second conductor.

After compression it is important that the second segment of the conductor joint has good conductive properties, preferably the same conducting properties as the second conductor to be connected. The contacting surface between the radially adjoining surfaces inside the sleeve should therefore have a high degree of friction/abutting surfaces. The radial distance of each step wall of the tubular sleeve and/or core rod may thus be equal or near equal to the corresponding radial thickness of a contacting layer of a stranded wire. The radial direction is in this context facing perpendicular to the longitudinal axis of the sleeve. Further, the step surface of each step surface of each stair of the tubular sleeve or core rod may have a length along the longitudinal axis X which is at least twice the radial thickness/distance of the step wall. Further, more than 50% of the outer surface of the core rod may be serrated or threaded and/or more than 50% of the inner surface of the tubular sleeve is serrated or threaded for achieving a high degree of friction between the radially adjoining surfaces.

The crossing/corner between a step surface and a step wall can be curved having corners being rounded by an arc of a circle, and wherein the radius of the circle is in the range from 5 mm to 80 mm, preferably between 10 mm and 70 mm, more preferably between 15 mm and 60 mm, for example 25 mm.

According to an example aspect of the invention, the first segment of the conductor joint may be a mirror structure of any one of the aspects of the second segment as disclosed above. Further, the first conductor to be connected to the first segment may have the same configuration as any one of the disclosed configurations of the second conductor as disclosed above.

In this example aspect both the first and second segment of the conductor joint are connected to the first and second conductor by compression of the first and second segment respectively.

In another example aspect, the first segment may comprise a first segment end of a conventional type for joining the first segment to the first conductor.

In an example aspect, at least a length of the first segment, in the longitudinal direction X distal to the opposite first segment end, may have a merely cylindrical shape wherein the first segment end can be joined to the first conductor by welding, for example fusion welding such as TIG-welding or MIG-welding. The first segment end may hence terminate in an inclined plane arranged at an angle α relative to the longitudinal direction X. The angle α may be from 20° to 70° relative to the longitudinal direction X, or preferably from 30° to 40°. Such weld joint are known from inter alia EP 3139443.

The conductor joint of the present invention can, in one example aspect, be made by molding the first and second segment as one piece.

In another example aspect the opposite second segment end of the second segment can be fixed to the opposite first segment end of the first segment by pressure welding or thermal welding, for example friction welding or brazing. As a result, the opposite second segment end of the second segment forms an integral part with the opposite first segment end of the first segment.

The conductor joint is preferably made prior to connecting the conductor joint to the first and second conductors.

The present invention further discloses a method for connecting the second conductor end of the second conductor to the second segment end of the second segment of the conductor joint according to any aspect disclosed above.

The second conductor is connected along a longitudinal direction X to the second segment of the conductor joint.

The second conductor end of the second conductor comprises
 a circular center wire comprising a terminal wall or a group of center wires comprising terminal walls,
 a plurality of concentrically arranged layers of stranded wires surrounding the center wire or the group of center wires, wherein each layer of stranded wires comprising a terminal wall.

Ends of the tubular sleeve and the core rod of the second segment arranged distal to the second segment end are merged at the merge structure while the opposite ends of the tubular sleeve and the core rod are arranged with a radial offset forming a sleeve opening.

The second segment end of the conductor joint is adapted for receiving at least a portion of the second conductor end of the second conductor into the sleeve opening at the second segment end.

The method for connecting the second segment with the second conductor comprises the following steps:
 i) inserting the second conductor end of the second conductor into the sleeve opening such that the opposite end of the core rod abuts or is adjacent to the terminal wall of the circular central wire of the second conductor or such that the opposite end of the core rod abuts or is adjacent to the terminal walls of the group of center wires of the second conductor and
 ii) compressing said tubular sleeve of second segment radially towards the core rod, thereby locking the conductor joint to the conductor end of the second conductor.

The method may further involve in step ii) circularly compressing the sleeve until the diameter of second segment of the joint is the same or similar to the diameter of the second conductor end of the second conductor.

According to the invention, the first segment and the second segment can be made of the same or different metal materials.

Further, the first and second segment of the conductor joint are in one example aspect made of the same metal as the conducting wires of the cable. In another example aspect the first and/or second segment are different from one or both of the first and second conductors to be joint. Accordingly, the selection of the metal such as cobber-based or aluminum-based for first segment, second segment, the first conductor and the second conductor can be freely selected depending on the requirements to the cable and it should be understood that all combinations are considered available options within the scope of the present invention. The conductors of the two HV cables to be connected have in one embodiment the same or close to the same cross-sectional diameter. In another embodiment the first and second conductor to be joint are different, such that one conductor has a different cross-sectional diameter, and/or strand configuration and/or material than the other conductor.

The term "metal materials" should be understood as any material comprising a conductive material such as an aluminum-based material or copper-based material. Aluminum-based materials should be understood as materials comprising at least 85% by weight aluminum, and copper-based materials should be understood as materials comprising at least 85% by weight copper. In a preferred aspect, the aluminum-based material comprises at least 95% by weight aluminum, and the copper-based material comprises at least 95% by weight copper.

According to the invention the term "radial offset" should be understood as a distance having a direction being perpendicular to the longitudinal direction X Further, the term "radial thickness" or "radial distance" should be understood as being perpendicular to the longitudinal direction X Within the context of the application, the term "conductor" refers to the electricity conducting element comprising a center wire or a group of center wires and a total number stranded wires surrounding the center wire or a group of center wires.

The term "conductor end" refers to an end-section of the first and/or second conductor which can be inserted into the tubular sleeve opening of the first and/or second conductor joint before compression, wherein any outer insulating layers and/or protective layers have been removed.

The term "stranded wires" refers to smaller wire-shaped elements that are stranded/twisted together to form a conductor. In one embodiment the stranded wires have a key-shaped cross-section. In another embodiment the stranded wires have a round cross section.

The term "keystone-shaped" means that the cross-section of each wire/strand has a key shaped form which can be of any form which allows each strand to lock itself to the adjacent strand such that a tight configuration between the strands is achieved. Such key-shaped strands and HV cables comprising such key-shaped strands are known in the art.

The term "round wires" refer to a conductor consisting of multiple round wires packed closely and optionally also compacted.

The term "radial" may not only refer to a direction perpendicular to the longitudinal direction X but may also refer to a direction having an inclined angle and/or wherein the radial component is more than 50% if not stated otherwise.

The term "wall" refers to a radial wall which can have different radial shapes such as straight, curved or arrow-shaped and is merely used to describe the terminal ends where the components abut or are arranged adjacent to each other before compression. Thus, the term should not be interpreted as a limiting feature. Further, the step wall does not have to be straight but may be uneven having recesses and/or being bulky.

The term "circular hydraulic pressure" refers to a hydraulic press exerting circular pressure onto the tubular sleeve by a circular shaped die, thereby forming at least a circular shaped second segment of the conductor joint causing some elongation of the second segment and the second conductor of the second cable during compression. A person skilled in the art will understand that the same will occur if the first segment is a mirror structure of the second segment, hence forming at least a circular shaped first segment of the joint causing some elongation of the first segment and the first conductor of the first cable during compression.

In the following description, numerous specific details are introduced to provide a thorough understanding of embodiments of the claimed joint and method. One skilled in the relevant art, however, will recognize that these embodiments can be practiced without one or more of the specific details.

BRIEF DESCRIPTION OF THE DRAWINGS

In the drawings, like reference numerals have been used to indicate like parts, elements or features unless otherwise explicitly stated or implicitly understood from the context.

DETAILED DESCRIPTION OF THE INVENTION

The invention will now be described with reference to specific examples of joining the conductors ends of two HV cables. It should be understood however that the invention is suitable for joining other types for conductors as long as the conductor is of the type having a circular center wire or group of center wires surrounded by stranded wires. It should also be understood that the different embodiments first and/or second segment of the conductor joint may be combined and adapted to fit different conductors.

Figure 1:
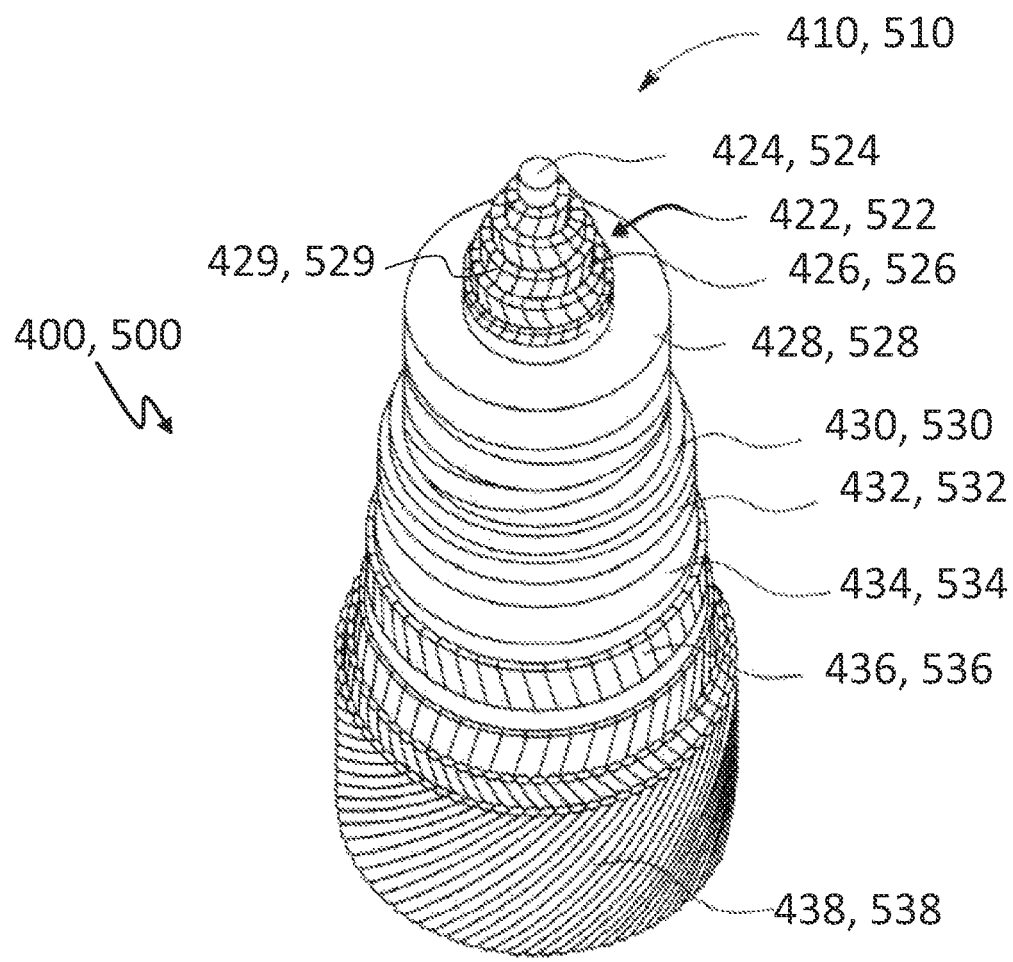
FIG. 1 is a perspective view of a first or second HVDC-MI cable known from prior art.

FIG. 1 shows a first and second HVDC-MI cable 400,500 known from prior art. Each cable 400, 500 comprises a conductor 410,510 having a conductor end 422,522. Each conductor 410,510 has a circular central wire 424,524 surrounded by layers 426,526 of stranded wires 429,529 providing flexibility of the cables 400, 500. Surrounding the conductor 410,510 are a plurality of insulating and/or protective layers. Immediately adjacent conductor 410,510 is an insulation layer 428,528 which can be a mass-impregnated paper insulation known in the art, comprising a plurality of wrapped layers of oil-impregnated paper or a XLPE insulation system. Outside the insulation layer 428,528 is a water tight lead barrier/layer 430, 530. About the lead layer 430,530 is arranged a polyethylene layer 432, 532. A strengthening layer 434, 534 of galvanized steel is arranged about the polyethylene layer 432,532. An armor layer 436, 536 comprising galvanized steel bands protects the cable from abrasion and other forces. Finally, the cables 410,510 comprise an outer protective layer 438,538 bitumen polypropylene yarn.

Figure 2A:
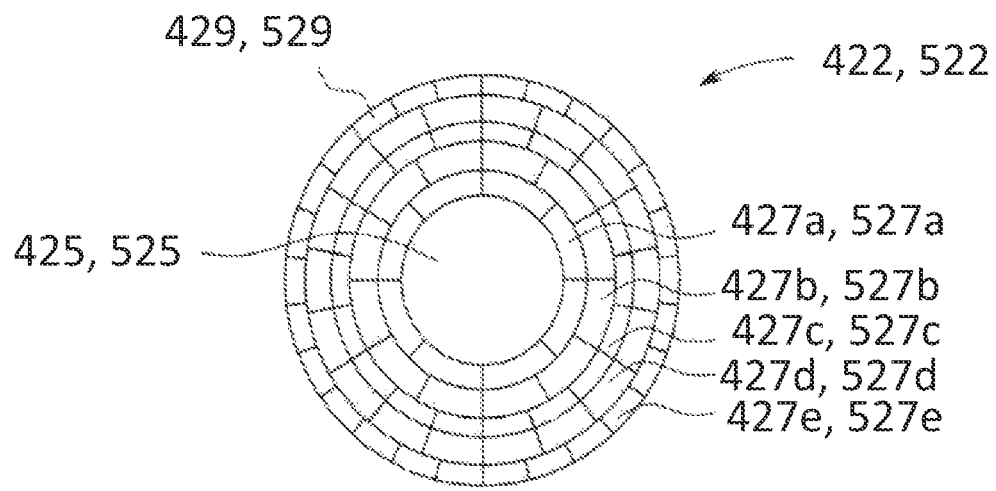
FIG. 2A is a cross-sectional view of the conductor in the HVDC-MI cable shown in FIG. 1.
Figure 2B:
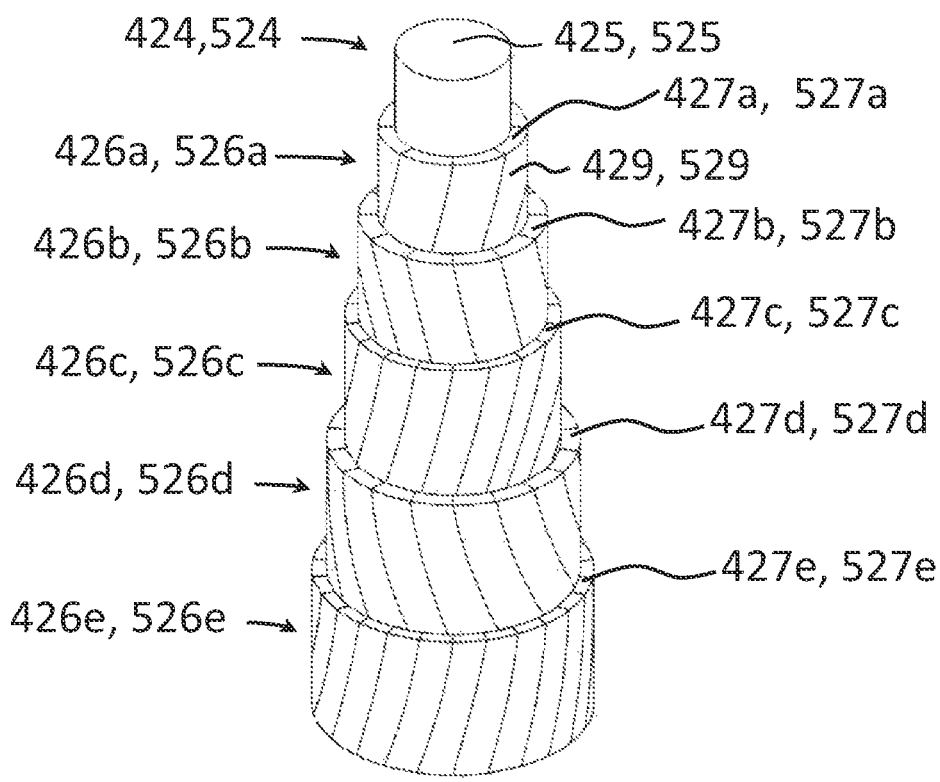
FIG. 2B is a perspective view of the conductor shown in FIG. 1 and FIG. 2A.

As shown in FIGS. 2A and 2B, the central wire 424,524 is a round/circular wire, and the stranded wires 429,529 are keystone-shaped to be tightly packed about the central wire 424, 524. In the examples used herein the first and second cable 410, 510 have five layers 426a-e,526a-e of stranded wires 429,529. The stranded wires 429,529 are wrapped in a spiral about the central wire 424,524, with alternating layers being wrapped in alternating directions as shown in FIG. 2B. Each layer 426a-e,526a-e of stranded wires 429, 529 has a terminal wall 427a-e,527a-e. Further, the circular center wire 424,524 has a terminal wall 425,525.

Figure 3:
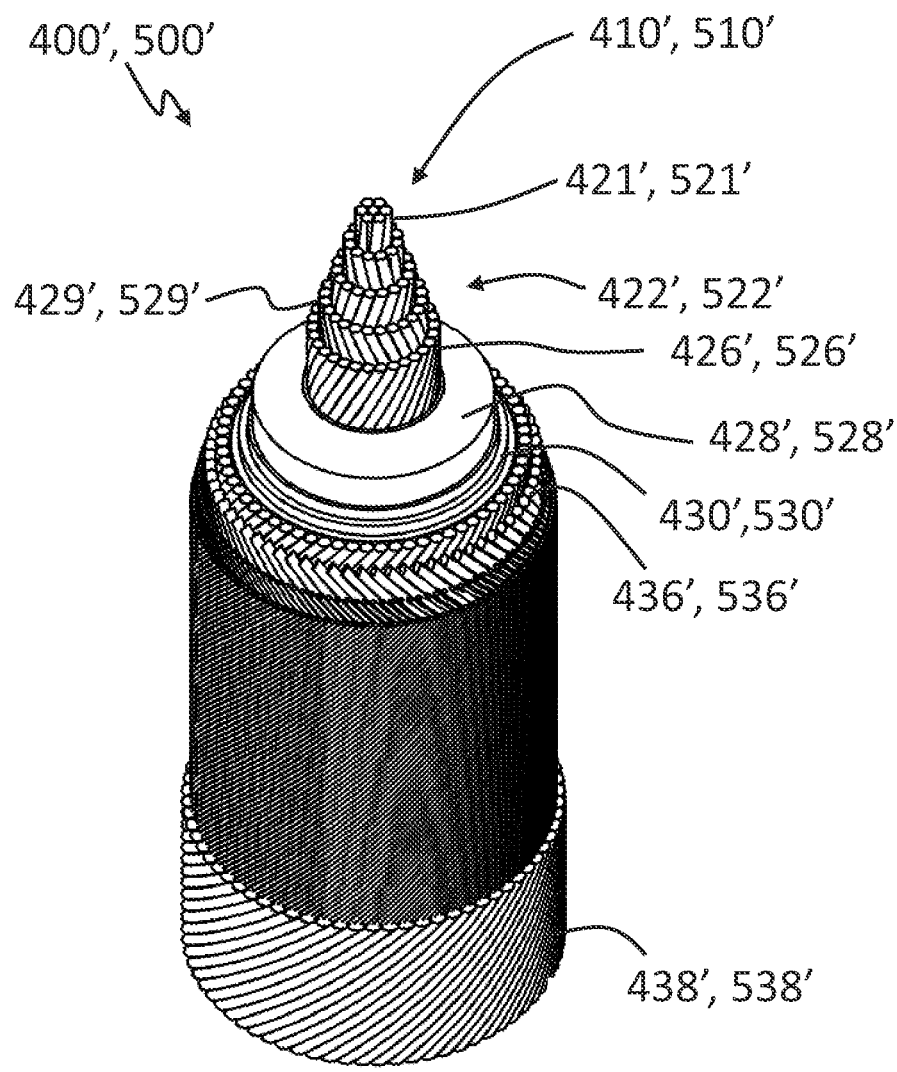
FIG. 3 is a perspective view of a first or second HV-XLPE cable known from prior art.
Figure 4A:
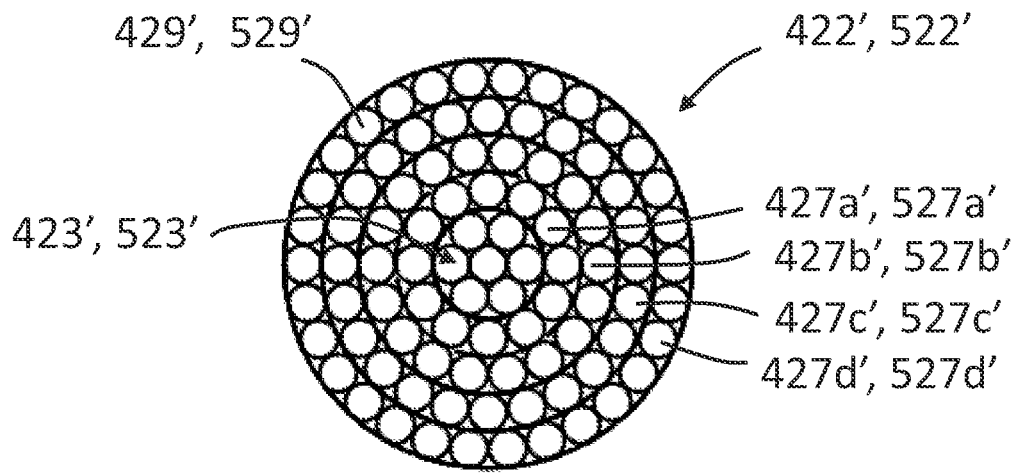
FIG. 4A is a cross-sectional view of the conductor in the HV-XLPE cable shown in FIG. 3.
Figure 4B:
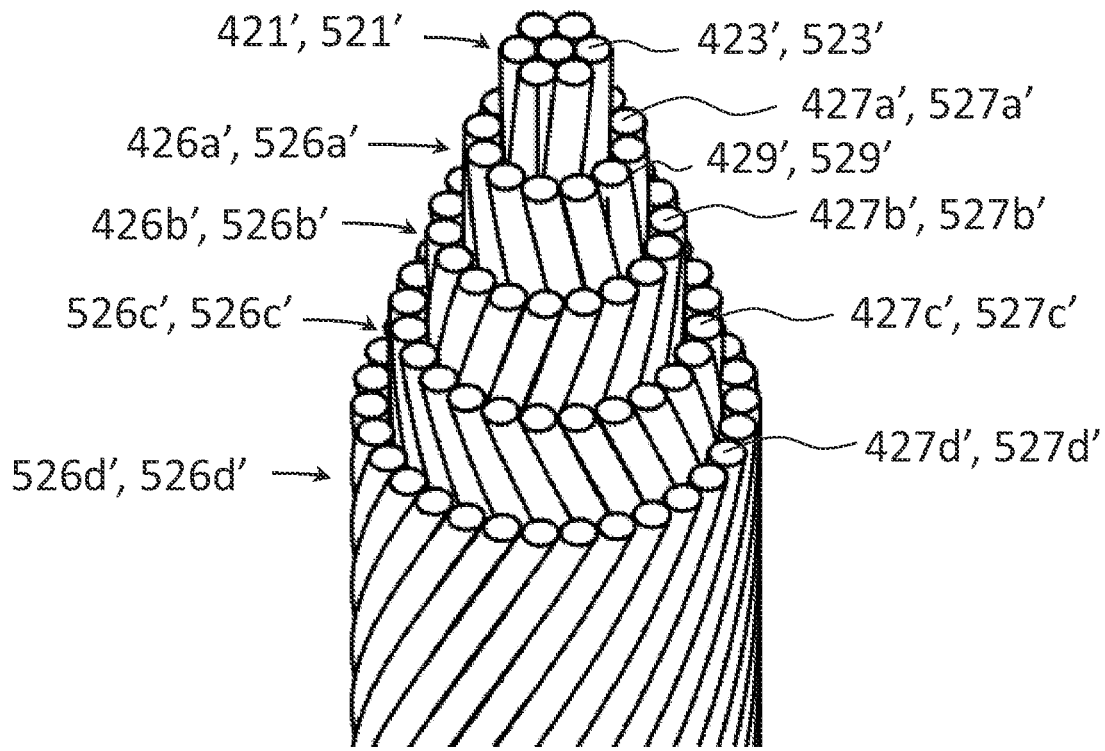
FIG. 4B is a perspective view of the conductor shown in FIG. 4A.

FIGS. 3, 4a and 4b show respectively a HV cable known from prior art with round wire conductor, the cross section and perspective view of the round wire conductor.

FIG. 3 shows a first and second HV cable 400',500'. Each cable 400',500' comprises a conductor 410',510' having a conductor end 422', 522'. Further, each conductor 410',510' has a group of center wires 421',521' surrounded by layers 426',526' of stranded wires 429',529' providing flexibility of the cables 400',500'. Surrounding the conductor 410',510' are a plurality of insulating and/or protective layers. Surrounding the conductor 410', 510' is an insulation layer 428',528' which can be a mass-impregnated paper insulation known in the art, comprising a plurality of wrapped layers of oil-impregnated paper or a XLPE insulation system. Outside the insulation layer 428',528' is a water tight lead barrier/layer 430',530'. An armor layer 436',536' comprising galvanized steel wires protects the cable from abrasion and other forces. Finally, the cables 400',500' comprise an outer protective layer 438',538'.

A person skilled in the art will appreciate that the cables shown in FIGS. 1 and 3 are only examples of HV cable designs and that the selection of insulation, field distribution layers, protection layers and armoring can be adapted to the requirements to the cables independently of the conductor joint according to the present invention.

As shown in FIGS. 4A and 4B, the group of center wires 421',521' is a group of round/circular wires, and the stranded wires 429',529' are also round wires packed about the group of center wires 421',521'. In the examples used herein the cable 400',500' has four layers 426a'-d',526a'-d' of stranded wires 429',529', but may comprise other amounts of layers. The stranded wires 429',529' are wrapped in a spiral around the group of center wires 421',521', with alternating layers being wrapped in alternating directions as shown in FIG. 4B. Each layer 426a'-d',526a'-d' of stranded wires 429', 529' has a terminal wall 427a'-d',527a'-d'. Further, the group of center wires 421',521' has terminal walls 423',523'.

FIGS. 5 to 8 show a first example embodiment a second segment 300 of the conductor joint 1 according to the invention.

Figure 5:
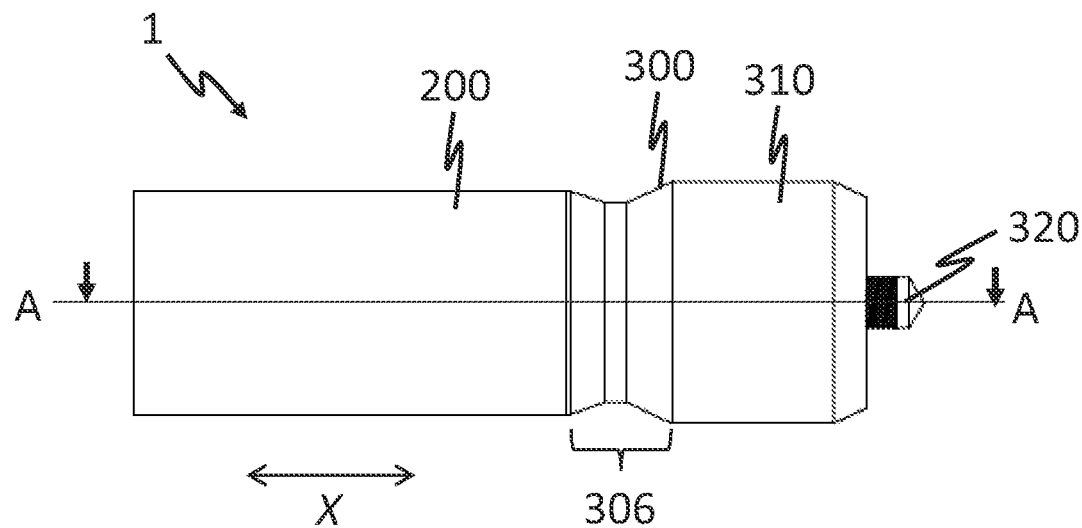
FIG. 5 is a side view of an example conductor joint according to the invention.

FIG. 5 is a perspective view the conductor joint 1 having a first segment 200 for connecting to a first conductor (not shown) and the second segment 300 for connecting to a second conductor (not shown). The second segment 300 has a merge structure 306 arranged immediately adjacent the first segment 200 in the longitudinal direction X Further, the second segment 300 has a tubular sleeve 310 and a core rod 320 arranged within the tubular sleeve.

The first segment 200 of the joint 1 is for illustrative purpose shown as cylindrical but may be of any shape for connecting to the first conductor.

Figure 6:
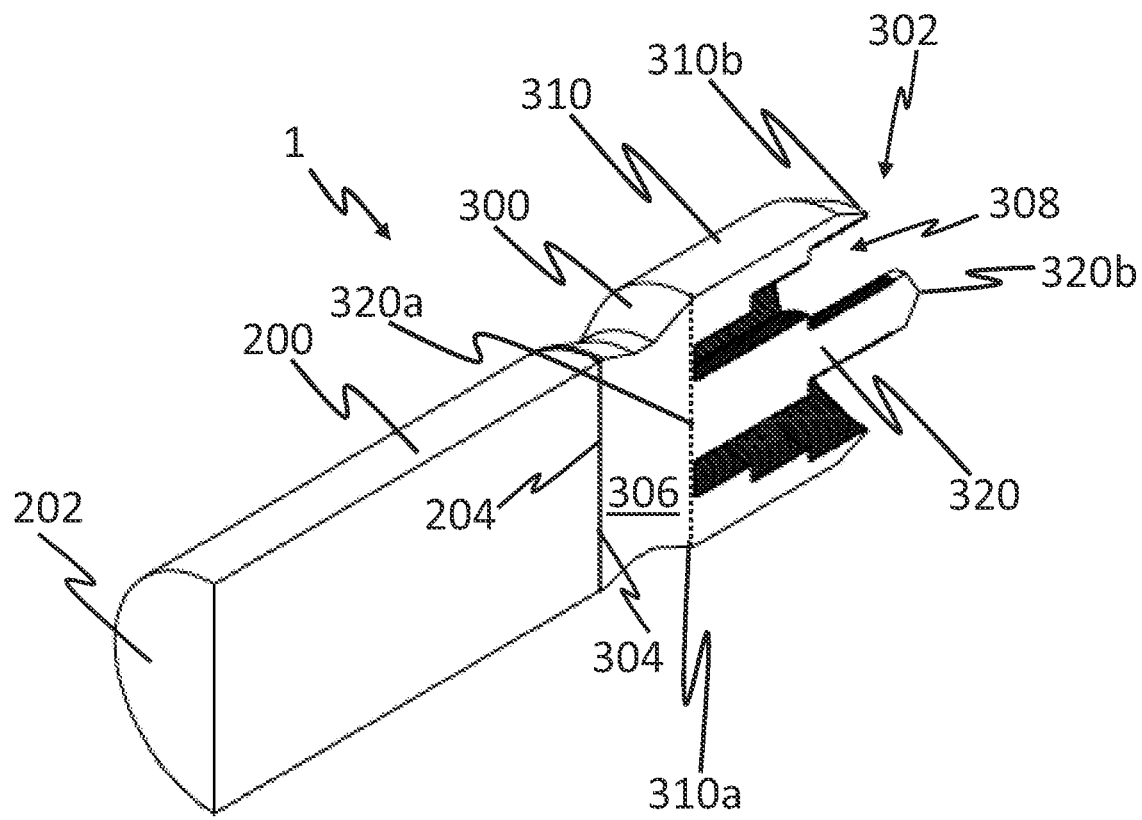
FIG. 6 is a cross sectional perspective view along A-A of an example conductor joint in FIG. 5.

FIG. 6 shows a cross sectional perspective view of the conductor joint 1 along A-A in FIG. 5.

The first segment 200 of the joint 1 is for illustrative purpose shown as cylindrical but may be of any shape for connecting to the first conductor. The first segment 200 has a segment end 202 for connecting to the first conductor and an opposite first segment end 204 which can be fixed to or integrated with the second segment 300 as one piece.

The second segment 300 to be connected with the second conductor has a first end 304 and an opposite segment end 302, where a merge structure 306, a tubular sleeve 310 and a core rod 320 is arranged between the first and opposite second end 304,302.

The merge structure 306 is shown as a merely cylindrical structure connected to/attached the opposite first segment end 204 of the first segment 200.

The tubular sleeve 310 of the second segment 300 has a first sleeve end 310a and an opposite second sleeve end 310b. The sleeve 310 extends along the longitudinal direction X. The first sleeve end 310a is merged at the merge structure 306 while the opposite second end 310b is arranged at the opposite segment end 302.

Within the sleeve 310 the core rod 320 is arranged having a first core rod end 320a and an opposite second core rod end 320b. The core rod 320 extends along the longitudinal direction X. The first core rod end 320a is merged at the merge structure 306 and arranged at a radial distance from the first sleeve end 310a. Further, the opposite second core rod end 320b is arranged at the opposite segment end 302. The core rod 320 is arranged at a radial distance from the sleeve 310 along its entire length.

A sleeve opening 308 is created between the sleeve 310 and the core rod 320 for inserting a portion of the second conductor (not shown).

Figure 7A:
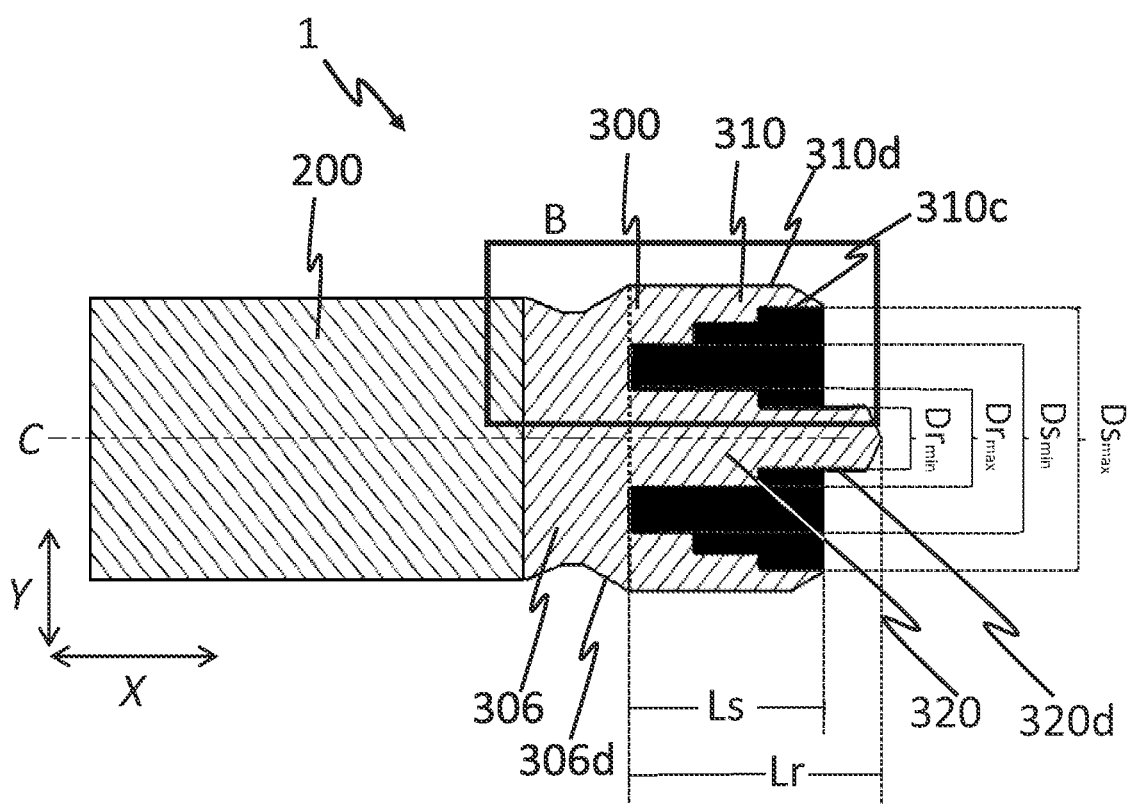
FIG. 7A is a cross sectional view along A-A of the conductor joint in FIG. 5.
Figure 7B:
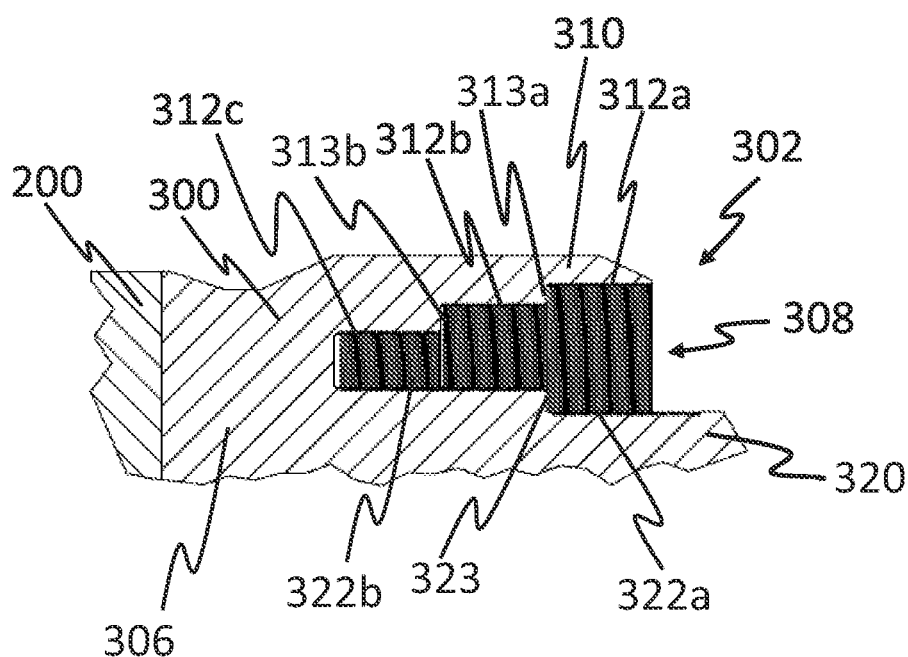
FIG. 7B is a detailed view of section B in FIG. 7A.

FIG. 7A shows a cross-sectional view along A-A of the conductor joint in FIG. 5 and hence shows a cross-sectional view of the first and second segment 200,300, while FIG. 7B is a detailed view of section/rectangular box B in FIG. 7A.

As shown, the second segment 300 has a tubular sleeve 310 extending a total length Ls and a core rod 320 arranged along the central axis C within the sleeve 310. The core rod extends a total length Lr being longer than the total sleeve length Ls.

The core rod has a stepped outer surface 320d, shown in more detail in FIG. 7B. The stepped outer surface includes a lower step core rod surface 322a and a higher step core rod surface 322b extending in the longitudinal direction X and a core rod step wall 323 arranged therebetween extending in the radial direction Y.

The core rod has a minimum outer diameter $Dr_{min}$ at the lower step core rod surface 322a, and a maximum outer diameter $Dr_{max}$ at the higher step core rod surface 322b. $Dr_{max}$ is larger than $Dr_{min}$. The higher step core rod surface 322b is arranged adjacent the merge structure 306, while the lower step core rod surface 322a is arranged distal the merge structure 306.

Further, the sleeve 310 surrounding the core rod 320 has a stepped inner surface 310c shaped as a tubular stair 312, shown in more detail in FIG. 7B. The stepped inner surface 310c of the sleeve 310 has three steps; a lower step surface 312a, an intermediate step surface 312b and a higher step surface 312c all three extending in the longitudinal direction X. A step wall 313a is arranged between the lower and intermediate step surfaces 312a,312b extending in the radial direction Y. An intermediate step wall 313b is arranged between the intermediate step surface 312b and the higher step surface 312c, also extending in the radial direction Y. The lower step surface 312a is arranged adjacent the merge structure 306 and the higher step surface 312c is arranged distal the merge structure 306. The intermediate step surface 312b is arranged between the lower and the higher step surfaces 312a,312c. Hence the sleeve 310 has a minimum inner diameter $Ds_{min}$ at the highest step surface 312c and a maximum inner diameter $Ds_{max}$ at the lower step surface 312a. All three step surfaces have the same longitudinal length.

It can also be seen that the higher core rod step surface 322b has a longitudinal length being twice the longitudinal length of higher step surface 312s of the sleeve 310.

Further, as shown in FIGS. 7A and 7B a sleeve opening 308 is created between the inner surface 310c of the sleeve 310 and the outer surface 320d of the core rod 320. The sleeve opening 308 is increasing in its radial length along the longitudinal direction X from the merge structure 306 towards the second segment end 302 due to the stepped outer surface 320d of the core rod 320 and the stepped inner surface 310c of the sleeve 310.

In the shown embodiment, the crossing/corner between the lower step surface 312a and the step wall 313a of the sleeve 310 is curved and the crossing/corner between the step wall 313a and the intermediate step surface 312b of the sleeve is about 90°.

The crossing/corner between the intermediate step surface 312b and the intermediate step wall 313b of the sleeve 310 is curved and the crossing/corner between the intermediate step wall 313b and the higher step surface 312c of the sleeve is about 90°.

Also, the crossing/corner between the lower step core rod surface 322a of the core rod 320 and the core rod step wall 323 is curved and the crossing/corner between the core rod step wall 323 and the higher step core rod surface 322b is about 90°. The opposite end of the core rod being distal to the merge structure 306 has the shape of an arrow.

It is also shown that all three the step surfaces 312a, 312b, 312c of the sleeve have equal longitudinal lengths arranged parallel to the longitudinal axis X of the sleeve.

Also, the step wall 313a and the intermediate step wall 313b have the same radial distance.

The outer surface 310d of the sleeve 310 is substantially tubular and extends parallel to the longitudinal center axis C of the sleeve 310. The sleeve 310 has an inclination angle at the opposite end of the sleeve 310 towards the longitudinal center axis C. The shown inclination angle is 30°. Further, about 85% of the outer surface 310d of the sleeve 310 is shown being parallel with the longitudinal center axis C of the sleeve 310.

Further, the outer surface 306a of the merge structure may have an inclination angle extending towards the outer surface 310d of the sleeve 310 and towards the outer surface of the first segment 200. Hence, the radial diameter of the merge structure may vary along the longitudinal direction of the merge structure 306 for obtaining a conductor joint having close to the same radial thickness of the second segment 300 as the second conductor after compression.

Figure 8:
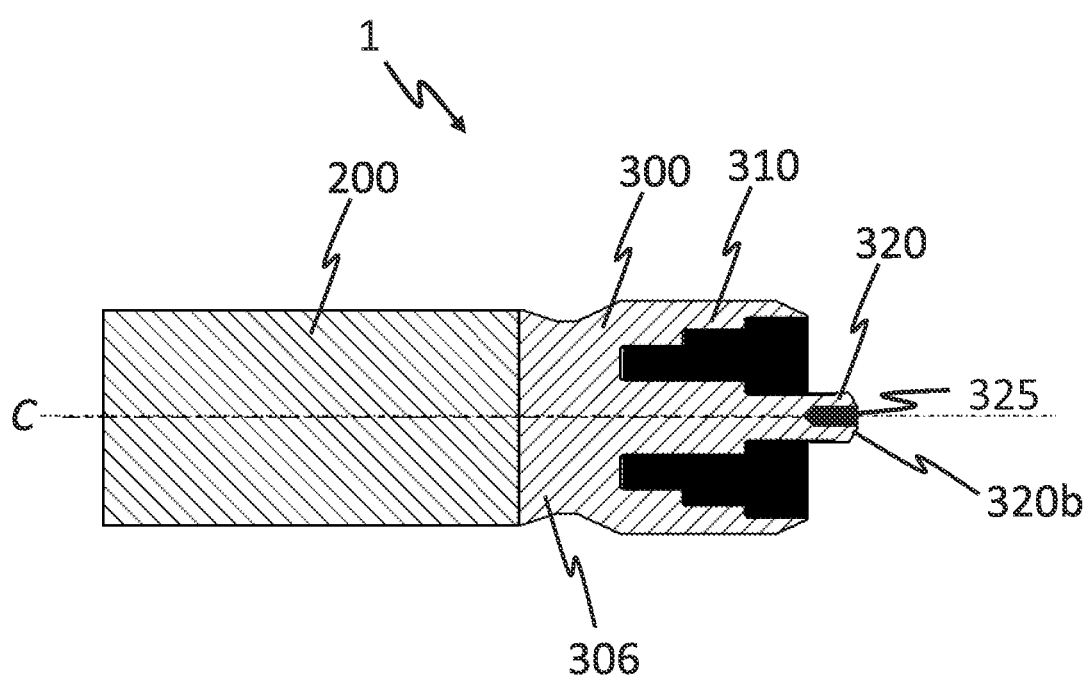
FIG. 8 is a cross-sectional view along A-A of an example conductor joint in FIG. 5.

FIG. 8 discloses another example embodiment of the second segment 300 than the embodiment disclosed above with regard to FIGS. 5 to 7. The sleeve 310 and merge structure are the same as disclosed above and the first segment 200 is for illustrative purpose shown as cylindrical but may be of any shape for connecting to the first conductor.

The shown conductor joint 1 is different from the above-mentioned embodiment in that the core rod 320 of the second segment 300 has a longitudinal recess 325 along the longitudinal direction X at the opposite end 320b of the core rod 320. The recess 325 is extending from the opposite second end 320b of the core rod 320 towards the merge structure 306. The longitudinal length of the recess may be from 5 to 50% of the core rod length Lr, preferably from 5 to 30%, for example 20% for improving the locked configuration after compression of the sleeve 310 onto the end portion of the second conductor (not shown).

This embodiment can be used for a machined end portion of the HV-cable 500 shown in FIG. 1, wherein the center wire 524 of the second conductor 510 has had an outer portion of the end portion removed such that the machined end portion of the center wire can be inserted into the recess 325 when joining the second conductor 510 to the second segment 300 of the conductor joint.

The embodiment can also be used for a machined end portion of a HV-cable 500' shown in FIG. 3 wherein the second conductor 510' has a group of center wires 521'. Hence, a portion of the group of center wires 521' can be removed such that inner portion can be inserted into the recess 325.

Figure 9:
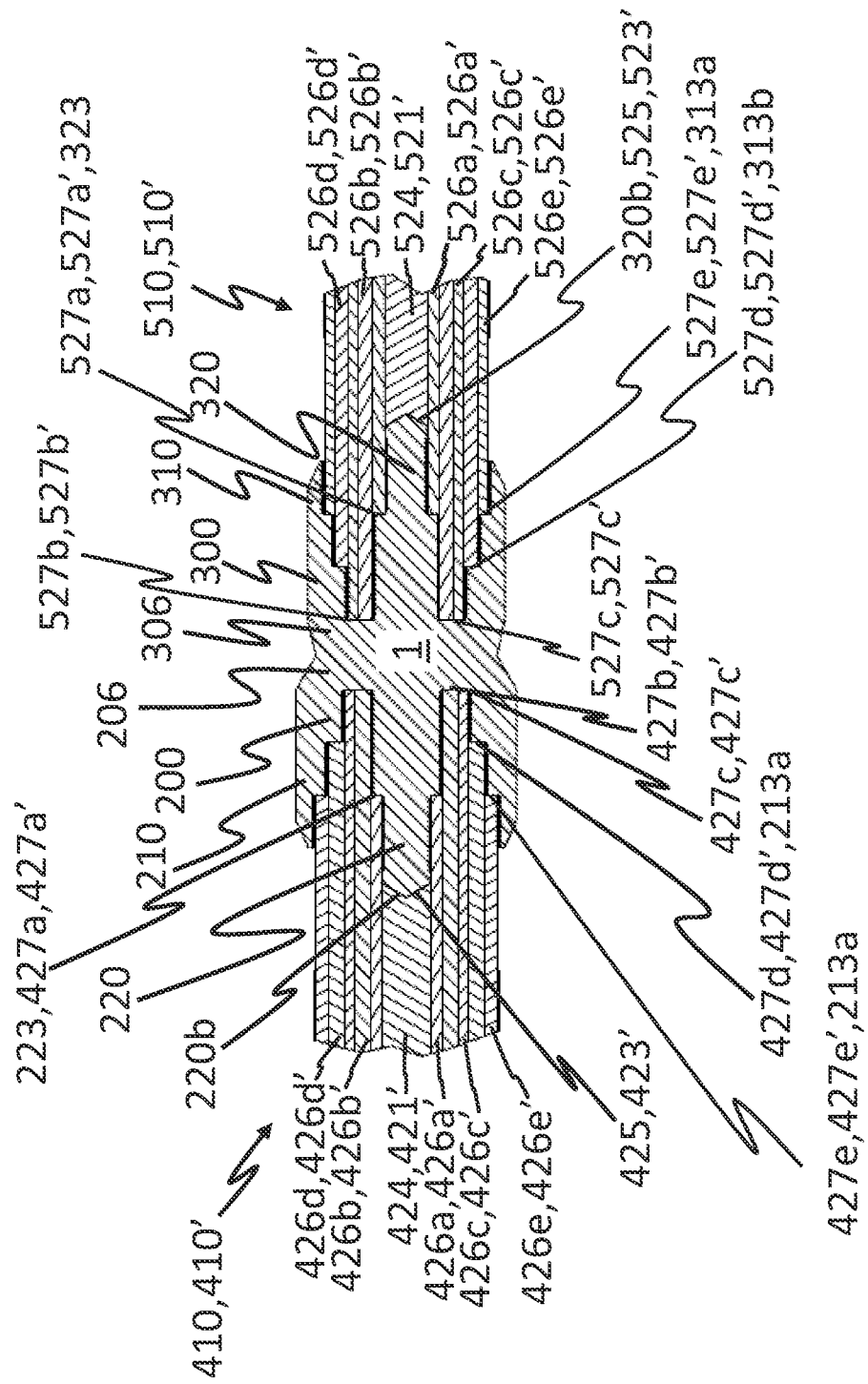
FIG. 9 is a cross-sectional view of a first example aspect of the connection between the conductor joint and the conductor ends of the first and second conductor.

FIG. 9 shows a first example embodiment of conductor joint 1 of the present invention wherein a connection between the conductor joint 1 and the end portions 422,422', 522',522' of a first and second conductors 410,410',510,510' has been established prior to compressing the first and second segment 200,300 of the joint 1.

In this embodiment the second segment 300 of the conductor joint 1 is as shown in FIGS. 5 to 7, while the first segment 200 is a mirror structure of the second segment 300.

Hence the first segment 200 comprises a first segment merge structure 206 which can be fixed to or being an integral part of the merge structure 306 of the second segment 300.

The first segment 200 has a first segment first end 204 and an opposite first segment second end 202, where the first segment merge structure 206, a first segment tubular sleeve 210 and a first segment core rod 220 are arranged between the first segment first end 204 and first segment opposite second end 302.

The first segment sleeve 210 has a first sleeve end and an opposite second sleeve end and extends along the longitudinal direction X. The first sleeve end is merged at the first segment merge structure 206 while the opposite second end is arranged at the opposite first segment second end 202.

Within the first segment sleeve 210 the first segment core rod 220 is arranged having a first core rod end and an opposite second core rod end. The core rod 220 extends along the longitudinal direction X. The first core rod end is merged at the first segment merge structure 206 and arranged at a radial distance from the first sleeve end. Further, the opposite second core rod end is arranged at the opposite first segment second end 202. The first segment core rod 220 is arranged at a radial distance from the first segment sleeve 210 along its entire length.

A first segment sleeve opening is created between the first segment sleeve 210 and the first segment core rod 220 wherein an end portion 422,422' of the first conductor 410,410' has been inserted.

Since the first segment 200 is a mirror structure of the second segment, the first segment sleeve 210 has a stepped inner surface and the first segment rod 320 has a stepped outer surface.

Hence, the first segment core rod 220 has a stepped outer surface. The stepped outer surface includes a lower step core rod surface and a higher step core rod surface extending in the longitudinal direction X and a core rod step wall 223 arranged therebetween extending in the radial direction Y. The higher step core rod surface is arranged adjacent the first segment merge structure 206, while the lower step core rod surface is arranged distal the first segment merge structure 206.

Further, the first segment sleeve 210 surrounding the core rod 220 has a stepped inner surface shaped as a tubular stair. The stepped inner surface of the sleeve 210 has three steps; a lower step surface, an intermediate step surface and a higher step surface all three extending in the longitudinal direction X. A step wall 213a is arranged between the lower and intermediate step surfaces extending in the radial direction Y. An intermediate step wall 213b is arranged between the intermediate step surface and the higher step surface, also extending in the radial direction Y. The lower step surface is arranged adjacent the merge structure 206 and the higher step surface is arranged distal the merge structure 206. The intermediate step surface is arranged between the lower and the higher step surfaces. Hence the first segment sleeve 210 has a minimum inner diameter at the highest step surface and a maximum inner diameter at the lower step surface. All three step surfaces have the same longitudinal length.

The first conductor 410,410' comprises a circular center wire 424 being the innermost wire (group of wires) of the first conductor 410,410'. The center wire 424 (or group of center wires 421) has a terminal wall 425 (or group of terminal walls shown as one terminal wall 423'), which has a corresponding shape to the arrow-shaped opposite second end 220b of the core rod 220 of the first segment 200. The radial face of the terminal wall 425 (or terminal walls 423') of the center wire 424 (or group of center wires 421') is abutting the radial face of opposite second end 220b of the core rod 220 of the first segment 200.

The first layer 426a,426a' of stranded wires of the first conductor 410,410' is immediately surrounding the circular center wire 424 (or group of center wires 421'). The first layer 426a,426a' of stranded wires has a terminal wall 427a,427a' which abuts the core rod step wall 223 of the first segment 200.

A second layer 426b,426b' of stranded wires of the first conductor 410,410' is immediately surrounding the first layer 426a,426a' of stranded wires. The second layer 426b, 426b' has a terminal wall 427b,427b' which abuts the merge structure 206 of the first segment 200.

A third layer 426c,426c' of stranded wires of the first conductor 410,410' is immediately surrounding the second layer 426b,426b' of stranded wires. The third layer 426c, 426c' has a terminal wall 427c,427c' which also abuts the merge structure 206 of the first segment 200.

A fourth layer 426d,426d' of stranded wires of the first conductor 410,410' is immediately surrounding the third layer 426c,426c' of stranded wires. The fourth layer 426d, 426d' is further having a terminal wall 427d,427d' abutting the intermediate step wall 213b of the inner surface of the sleeve 210 of the first segment 200.

A fifth layer 426e,426e' of stranded wires of the first conductor 410,410' is immediately surrounding the fourth layer 426d,426d' of stranded wires. The fifth layer 426e, 426e', which is the outermost layer of stranded wires of the first conductor 410,410', is further having a terminal wall 427e,427e' abutting the step wall 213a of the inner surface of the sleeve 210 of the first segment 200.

Similarly, the second conductor 510,510' comprises a circular center wire 524 (or group of center wires 521') being the innermost wire (or group of wires) of the second conductor 510,510'. The center wire 524 (or group of center wires 521') has a terminal wall 525 (or group of terminal walls shown as one terminal wall 523') which is shown to have a corresponding shape to the arrow-shaped opposite second core rod end 320b of the core rod 320 of the second segment 300. A radial face of the terminal wall 525 (group of terminal walls (523') of the center wire 524 (or group of center wires 521') is abutting the radial face of the opposite second core rod end 320b of the second segment 300.

A first layer 526a,526a' of stranded wires of the second conductor 510,510' is immediately surrounding the circular center wire 524 (or group of center wires 521'). The first layer 526a,526a' of stranded wires has a terminal wall 527a,527a' which abuts the core rod step wall 323 of the second segment 300.

A second layer 526b,526b' of stranded wires of the second conductor 510,510' is immediately surrounding the first layer 526a,526a' of stranded wires. The second layer 526b, 526b' has a terminal wall 527b,527b' which abuts the merge structure 306 of the second segment 300.

A third layer 526c,526c' of stranded wires of the second conductor 510,510' is immediately surrounding the second layer 526b,526b' of stranded wires. The third layer 526c, 526c' has a terminal wall 527c,527c' which also abuts the merge structure 306 of the second segment 300.

A fourth layer 526d,526d' of stranded wires of the second conductor 510,510' is immediately surrounding the third layer 526c,526c' of stranded wires. The fourth layer 526d, 526d' is further having a terminal wall 527d,527d' abutting the intermediate step wall 313b of the inner surface of the sleeve 310 of the first segment 300.

A fifth layer 526e,526e' of stranded wires of the second conductor 510,510' is immediately surrounding the fourth layer 526d,526d' of stranded wires. The fifth layer 526e, 526e', which is the outermost layer of stranded wires of the second conductor 510,510', is further having a terminal wall 527e,527e' abutting the step wall 313a of the inner surface of the sleeve 310 of the second segment 300.

The compression of the sleeve 210 of the first segment 200 causes the layers of stranded wires of the first conductor 410,410' to be squeezed between the outer sleeve 210 and the core rod 220. Similarly, compression of the sleeve 310 of the second segment 300 causes the layers of stranded wires of the second conductor 510,510' to be squeezed between the outer sleeve 310 and the core rod 320 of the second segment 300.

This external compression is performed directly on the sleeve 210 of the first segment 200 and on the sleeve 310 of the second segment 300 by for example a hydraulic press of 200 tons (200 000 kg) or more. An internal compression of the joint is performed indirectly by the core rods 220,320 of the first and second segment 200,300.

The first segment and the second segment of the resulting joint may advantageously have the same outer diameter as the conductors of the first and second conductor respectively. The core rods of the first and second segment of the conductor joint and the layers of stranded wires of the first and second conductors are lengthened in the longitudinal direction during compression.

After compression, the inner longitudinal step-shaped surface of the sleeves of the first and second segment of the conductor joint, the longitudinal outer surface of the layers of stranded wires of the first and second conductor and the outer surface of the core rods of the first and second segment are altered into a wave-shape in the longitudinal direction and a locked configuration/locking mechanism/ward between the layers of stranded wires of the end portions of the first and second conductors and the conductor joint is formed.

During compression small air pockets can be formed at the terminal walls of the layers of stranded wires of the first and second conductors. Hence, the electric current passing through the conductor joint after connection is also moved in an alternating direction having a wave-shape in the longitudinal direction thereby avoiding being terminated by the air pockets. A serrated or threaded outer surface of the core rods and a rerated or threaded inner surface of the sleeves is therefore advantageous for achieving a high degree of friction between the radially adjoining surfaces allowing the electric current to pass therethrough.

Figure 10:
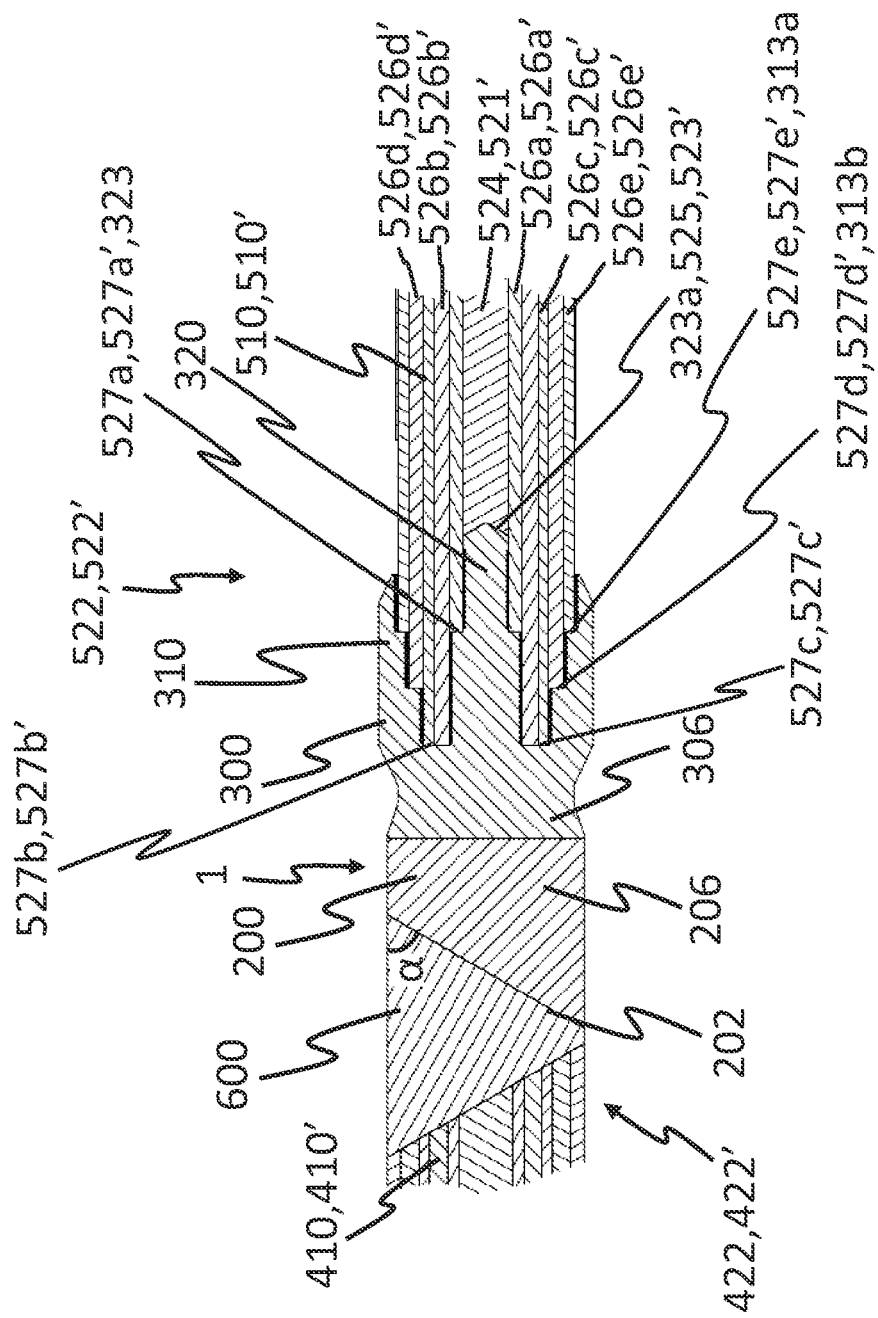
FIG. 10 is a cross-sectional view of a second example aspect of the connection between the conductor joint and the conductor ends of the first and second conductor.

FIG. 10 shows a second example embodiment of a conductor joint according to the invention, wherein a connection between the conductor joint 1 and the end portions 422,422',522',522' of a first and second conductors 410,410', 510,510' has been established.

In this embodiment the second segment 300 of the conductor joint 1 is as shown in FIGS. 5 to 7 and 9, while the first segment 200 has a substantially tubular structure wherein the first segment end 202 is arranged to be connected to the first conductor 410,410' by welding.

As disclosed with regard to FIG. 9 the second conductor 510,510', which is to be connected to the second segment 300 of the conductor joint 1, comprises a circular center wire 524 (or group of center wires 521') being the innermost wire (or group of wires) of the second conductor 510,510'. The center wire 524 (or group of center wires 521') has a terminal wall 525 (or group of terminal walls shown as one terminal wall 523') which is shown to have a corresponding shape to the arrow-shaped opposite second core rod end 320b of the core rod 320 of the second segment 300. A radial face of the terminal wall 525 (group of terminal walls (523') of the center wire 524 (or group of center wires 521') is abutting the radial face of the opposite second core rod end 320b of the second segment 300.

A first layer 526a,526a' of stranded wires of the second conductor 510,510' is immediately surrounding the circular center wire 524 (or group of center wires 521'). The first layer 526a,526a' of stranded wires has a terminal wall 527a,527a' which abuts the core rod step wall 323 of the second segment 300.

A second layer 526b,526b' of stranded wires of the second conductor 510,510' is immediately surrounding the first layer 526a,526a' of stranded wires. The second layer 526b, 526b' has a terminal wall 527b,527b' which abuts the merge structure 306 of the second segment 300.

A third layer 526c,526c' of stranded wires of the second conductor 510,510' is immediately surrounding the second layer 526b,526b' of stranded wires. The third layer 526c, 526c' has a terminal wall 527c,527c' which also abuts the merge structure 306 of the second segment 300.

A fourth layer 526d,526d' of stranded wires of the second conductor 510,510' is immediately surrounding the third layer 526c,526c' of stranded wires. The fourth layer 526c, 526d' is further having a terminal wall 527c,527d' abutting the intermediate step wall 313b of the inner surface of the sleeve 310 of the first segment 300.

A fifth layer 526e,526e' of stranded wires of the second conductor 510,510' is immediately surrounding the fourth layer 526d,526d' of stranded wires. The fifth layer 526e, 526e', which is the outermost layer of stranded wires of the second conductor 510,510', is further having a terminal wall 527e,527e' abutting the step wall 313a of the inner surface of the sleeve 310 of the second segment 300.

Compression of the sleeve 310 of the second segment 300 causes the layers of stranded wires 526a-e,526a'-e' of the second conductor 510,510' to be squeezed between the outer sleeve 310 and the core rod 320 of the second segment.

The merge structure 206 of the first segment 200 can be fixed to the merge structure 306 of the second segment 300 by friction welding.

Further, the first segment end 202 terminates in an inclined plane arranged at an angle α of 40° relative to the longitudinal direction X for connecting to and the end portion of the first conductor 400 by fusion welding via a weld joint 600. Such welding is inter alia known from EP3139443 A1 incorporated herein by reference.

In the preceding description, various aspects of the conductor joint according to the invention have been described with reference to the illustrative embodiment. For purposes of explanation, specific numbers, systems and configurations were set forth in order to provide a thorough understanding of the joint and its workings. However, this description is not intended to be construed in a limiting sense. Various modifications and variations of the illustrative embodiment, as well as other embodiments of the conductor joint, which are apparent to persons skilled in the art to which the disclosed subject matter pertains, are deemed to lie within the scope of the present invention.

LIST OF REFERENCE NUMERALS/LETTERS

| | |
|---|---|
| 1 | Conductor joint |
| 200 | First segment |
| 202 | First segment end |
| 204 | Opposite first segment end |
| 206 | Merge structure of first segment |
| 208 | Sleeve opening of first segment |
| 210 | Tubular sleeve of first segment |
| 210a | End of tubular sleeve of first segment distal to the first segment end/first sleeve end of first segment |
| 210b | Opposite end of tubular sleeve of first segment/opposite second end of tubular sleeve of first segment |
| 212 | Tubular stair of first segment |
| 212a | Lower step surface of tubular sleeve of first segment |
| 212b | Intermediate step surface of tubular sleeve of first segment |
| 212c | Intermediate step surface of tubular sleeve of first segment |
| 213a | Step wall of tubular sleeve of first segment |
| 213b | Intermediate step wall of tubular sleeve of first segment |
| 220 | Core rod of first segment |
| 220a | End of core rod distal to the first segment end/first core rod end of first segment |
| 220b | Opposite end of core rod of first segment/opposite second core rod end of first segment |
| 223 | Core rod step wall of first segment |
| 225 | Longitudinal recess of the core rod of first segment |
| 300 | Second segment |
| 302 | Second segment end |
| 304 | Opposite second segment end |
| 306 | Merge structure of second segment |
| 308 | Sleeve opening of second segment |
| 310 | Tubular sleeve of second segment |
| 310a | End of tubular sleeve of second segment distal to the second segment end/first sleeve end of second segment |
| 310b | Opposite end of tubular sleeve of second segment/opposite second sleeve end of second segment |
| 310c | Inner surface of tubular sleeve of second segment |
| 310d | Outer surface of tubular sleeve of second segment |
| 312 | Tubular stair of second segment |
| 312a | Lower step surface of tubular sleeve of second segment |
| 312b | Intermediate step surface of tubular sleeve of second segment |
| 312c | Intermediate step surface of tubular sleeve of second segment |

-continued

| | |
|---|---|
| 313a | Step wall of tubular sleeve of second segment |
| 313b | Intermediate step wall of tubular sleeve of second segment |
| 320 | Core rod of second segment |
| 320a | End of core rod distal to the second segment end/first core rod end of second segment |
| 320b | Opposite end of core rod of second segment/opposite second core rod end of second segment |
| 320d | Outer surface of core rod of second segment |
| 322a | Lower step core rod surface of second segment |
| 322c | Higher step core rod surface of second segment |
| 323 | Core rod step wall of second segment |
| 325 | Longitudinal recess of the core rod of second segment |
| 400, 400' | First cable |
| 410, 410' | First conductor |
| 421' | Group of center wires of first conductor |
| 422, 422' | End portion of first conductor |
| 423' | Terminal wall of group of center wires of first conductor |
| 424 | Circular center wire of first conductor |
| 425 | Terminal wall of center wire of first conductor |
| 426, 426' | Layer of stranded wires of first conductor |
| 426a, 426a' | First layer of stranded wires of first conductor |
| 426b, 426b' | Second layer of stranded wires of first conductor |
| 426c, 426c' | Third layer of stranded wires of first conductor |
| 426d, 426d' | Fourth layer of stranded wires of first conductor |
| 426e, 426e' | Fifth layer of stranded wires of first conductor |
| 427a, 427a' | Terminal wall of first layer of stranded wires of first conductor |
| 427b, 427b' | Terminal wall of second layer of stranded wires of first conductor |
| 427c, 427c' | Terminal wall of third layer of stranded wires of first conductor |
| 427d, 427d' | Terminal wall of fourth layer of stranded wires of first conductor |
| 427e, 427e' | Terminal wall of fifth layer of stranded wires of first conductor |
| 428, 428' | Insulation layer of first conductor |
| 429, 429' | Stranded wire of first conductor |
| 430, 430' | Lead barrier layer of first conductor |
| 432 | Polyethylene layer of first conductor |
| 434 | Strengthening layer of first conductor |
| 436, 436' | Armor layer of first conductor |
| 438, 438' | Outer protective layer of first conductor |
| 500, 500' | Second cable |
| 510, 510' | Second conductor |
| 521' | Group of center wires of second conductor |
| 522, 522' | End portion of second conductor |
| 523' | Terminal walls of group of center wires of second conductor |
| 524 | Circular center wire of second conductor |
| 525 | Terminal wall of center wire of second conductor |
| 526, 526' | Layer of stranded wires of second conductor |
| 526a, 526a' | First layer of stranded wires of second conductor |
| 526b, 526b' | Second layer of stranded wires of second conductor |
| 526c, 526c' | Third layer of stranded wires of second conductor |
| 526d, 526d' | Fourth layer of stranded wires of second conductor |
| 526e | Fifth layer of stranded wires of second conductor |
| 527a, 527a' | Terminal wall of first layer of stranded wires of second conductor |
| 527b, 527b' | Terminal wall of second layer of stranded wires of second conductor |
| 527c, 527c' | Terminal wall of third layer of stranded wires of second conductor |
| 527d, 527d' | Terminal wall of fourth layer of stranded wires of second conductor |
| 527e | Terminal wall of fifth layer of stranded wires of second conductor |
| 528, 528' | Insulation layer of second conductor |
| 529, 529' | Stranded wire of second conductor |
| 530, 530' | Lead barrier layer of second conductor |
| 532 | Polyethylene layer of second conductor |
| 534 | Strengthening layer of second conductor |
| 536, 536' | Armor layer of second conductor |
| 538, 538' | Outer protective layer of second conductor |
| 600 | Weld joint |
| C | central longitudinal axis of the conductor joint |
| X | Longitudinal direction |
| Y | Radial direction |

The invention claimed is:

1. A conductor joint for connecting two conductors along a longitudinal direction, said conductor joint comprising:
a first segment having
a first segment end, relative to the longitudinal direction, adapted for connecting to an end portion of a first conductor and an opposite first segment end connected to a second segment,
said second segment having
a second segment end, relative to the longitudinal direction, adapted for forming an integral part with said opposite first segment end of the first segment, relative to the longitudinal direction, at a merge structure,
and,
an opposite second segment end, relative to the longitudinal direction for receiving a second conductor end of a second conductor,
wherein said second segment includes at least a tubular sleeve having a minimum inner diameter Dsmin and a sleeve length Ls extending in the longitudinal direction between the opposite second segment end and said merge structure; and
wherein said second segment also includes a solid core rod coaxial within the tubular sleeve, the solid core rod having a core rod length Lr extending in the longitudinal direction between the opposite second segment end and the merge structure and wherein the solid core rod further has a maximum outer diameter Drmax being less than the minimum inner diameter Dsmin, and
wherein ends of the tubular sleeve and the solid core rod distal to the second segment end are merged at the merge structure into a single piece and wherein opposite ends of the tubular sleeve and the solid core rod proximal said opposite second segment end are arranged with a radial offset.

2. The conductor joint according to claim 1, wherein the core rod length Lr is equal to or longer than the tubular sleeve length Ls.

3. The conductor joint according to claim 1, wherein the tubular sleeve comprises
a stepped inner surface shaped as a tubular stair comprising,
a lower step surface at the second segment end,
a higher step surface distal to the second segment end and
a step wall arranged between the lower step surface and the higher step surface, the step wall being oriented with a non-zero angle to the lower step surface and the higher step surface.

4. The conductor joint according to claim 3, wherein the tubular stair further comprises
an intermediate step surface and an intermediate step wall arranged between the step wall and the higher step surface, the intermediate step wall being oriented with a non-zero angle to the intermediate step surface and the higher step surface.

5. The conductor joint according claim 3, wherein the length of each step surface along the longitudinal direction of the sleeve are equal or near equal.

6. The conductor joint according to claim 3, wherein the radial distance of the step wall of the sleeve is equal or near equal to a radial thickness of an outermost layer of stranded wires of the second conductor to be connected.

7. The conductor joint according to claim 3, each step surface has a length along the longitudinal direction of the sleeve which is at least twice a radial height of the step wall.

8. The conductor joint according to claim 1, wherein the solid core rod has a stepped outer surface shaped as a tubular stair comprising
a lower step core rod surface at the second segment end,
a higher step core rod surface distal to the second segment end and
a core rod step wall arranged between the lower step core rod surface and the higher step core rod surface, the core rod step wall being oriented with a non-zero angle to the lower step core rod surface and the higher step core rod surface.

9. The conductor joint according to claim 1, wherein the solid core rod further comprises
a longitudinal recess for inserting a portion of the second conductor end of the second conductor, the recess extending in the longitudinal direction from a terminal end of the core rod towards the merge structure.

10. The conductor joint according to claim 1, wherein the sleeve length Ls is equal to or longer than an outer diameter of the second conductor end to be connected.

11. The conductor joint according to claim 1, wherein an outer diameter of the solid core rod is equal or smaller than an outer diameter of a center wire, or a maximum outer diameter of a group of center wires, of the second conductor end to be connected.

12. The conductor joint according to claim 1, wherein more than 50% of an outer surface of the solid core rod is serrated.

13. The conductor joint according to claim 1, wherein more than 50% of an inner surface of the sleeve is serrated.

14. The conductor joint according to claim 1, wherein the first segment is a mirror structure of the second segment.

15. The conductor joint according claim 1, wherein the first segment and the second segment are made of equal metal materials.

16. The conductor joint according to claim 15, wherein the first segment and the second segment comprises at least 95% by weight aluminum or at least 95% by weight copper.

17. The conductor joint according to claim 1, wherein the first segment is made of a first metal material and the second segment is made of a second metal material different from the first metal material.

18. The conductor joint according to claim 17, wherein the first material comprises at least 95% by weight copper and the second material comprises at least 95% by weight aluminum.

19. The conductor joint according to claim 17, wherein the opposite second segment end of the second segment is fixed to the opposite first segment end of the first segment by pressure welding.

20. The conductor joint according to claim 1, wherein at least a length of the first segment in the longitudinal direction distal to the opposite first segment end has a cylindrical shape.

21. The conductor joint according to claim 20, wherein the first segment end terminates in an inclined plane arranged at an angle α of from 20 to 70 degrees relative to the longitudinal direction.

22. The conductor joint according to claim 20, wherein the first segment is made of a first metal material and the second segment is made of a second metal material different from the first metal material.

23. The conductor joint according to claim 22, wherein the first material comprises at least 95% by weight copper and the second material comprises at least 95% by weight aluminum.

24. The conductor joint according to claim 20, wherein the first segment and the second segment of the conductor joint are fixedly connected by pressure welding.

25. A method for connecting a second conductor along a longitudinal direction to a conductor joint,
wherein a second conductor end of the second conductor comprises
a circular center wire comprising a terminal wall or a group of center wires comprising terminal walls,
a plurality of concentrically arranged layers of stranded wires surrounding the circular center wire
or the group of center wires, wherein each layer of stranded wires comprising a terminal wall, and
wherein the conductor joint comprises
a first segment having
a first segment end, relative to the longitudinal direction adapted for connecting to an end portion of a first conductor and an opposite first segment end connected to a second segment,
said second segment having
a second segment end, relative to the longitudinal direction adapted for forming an integral part with said opposite first segment end of the first segment, relative to the longitudinal direction, at a merge structure, and,
an opposite second segment end, relative to the longitudinal direction for receiving a second conductor end of a second conductor,
wherein said second segment includes at least a tubular sleeve having a minimum inner diameter Dsmin and a sleeve length Ls extending in the longitudinal direction between the opposite second segment end and said merge structure; and
wherein said second segment also includes a solid core rod coaxial within the tubular sleeve, the solid core rod having a core rod length Lr extending in the longitudinal direction between the opposite second segment end and the merge structure and wherein the solid core rod further has a maximum outer diameter Drmax being less than the minimum inner diameter Dsmin, and
wherein ends of the tubular sleeve and the solid core rod distal to the second segment end are merged at the merge structure into a single piece and wherein opposite ends of the tubular sleeve and the solid core rod are arranged with a radial offset forming a sleeve opening,
wherein the method comprises the following steps:
i) inserting the second conductor end of the second conductor into the sleeve opening such that the opposite end of the solid core rod abuts or is adjacent to the terminal wall of the circular central wire of the second conductor or such that the opposite end of the core rod abuts or is adjacent to the terminal walls of the group of center wires of the second conductor and
ii) compressing said sleeve radially towards the solid core rod, thereby locking the conductor joint to the conductor end of the second conductor.

26. The method according to claim 25, wherein step ii) involves circularly compressing the sleeve until the diameter of a jointed section is the same or similar to the diameter of the second conductor end of the second conductor.

* * * * *